United States Patent [19]

Iwama et al.

[11] 3,850,586

[45] Nov. 26, 1974

[54] GELLED HYDROCARBON COMPOSITION

[75] Inventors: Akira Iwama, Tokyo; Mitsuru Toyoguchi, Yokohama; Kikuo Takehara; Yasumasa Hamuro, both of Kyoto, all of Japan

[73] Assignees: Dai-Ichi Kogyo Seiyaku Co., Ltd., Kyoto-shi, Kyoto-fu; Mitsubishi Oil Company, Tokyo-to, both of, Japan

[22] Filed: Mar. 30, 1973

[21] Appl. No.: 347,405

[30] Foreign Application Priority Data

Apr. 13, 1972  Japan.............................. 47-037438
July 8, 1972  Japan.............................. 47-068407

[52] U.S. Cl...................... 44/7 A, 44/7 C, 44/7 D, 44/51
[51] Int. Cl.............................................. C10l 7/00
[58] Field of Search............. 44/7 A, 7 C, 7 D, 7 R, 44/51

[56] References Cited
UNITED STATES PATENTS

| | | | |
|---|---|---|---|
| 2,828,265 | 3/1958 | Van Strien.................. | 44/7 D |
| 2,860,103 | 11/1958 | Buchanan et al.................. | 44/7 A |
| 3,539,310 | 11/1970 | Finkelstein et al.................. | 44/7 A |

*Primary Examiner*—Benjamin R. Padgett
*Attorney, Agent, or Firm*—Wenderoth, Lind & Ponack

[57] ABSTRACT

Gelled hydrocarbon composition useful for combustion devises, comprising essentially at least 80 wt. percent of a liquid hydrocarbon having a boiling point of 30° to 390°C as an internal phase, at least 0.05 wt. percent of water as an external phase and at least 0.05 wt. percent of a gelling agent selected from (i) a gelling agent of the formula (I), alone or mixture thereof with other gelling agent:

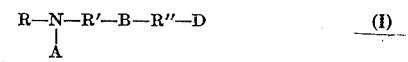

and (ii) a mixture of a nonionic surface active agent having polyalkyleneoxide chain in the molecule and a carboxylic acid or its salt, and further an amine compound may be also admixed therewith when the gelling agent is the one of the formula (I). The gelled hydrocarbon composition contains the liquid hydrocarbon in extremely high concentration, and can be stably preserved for a long time and has excellent properties, such as good combustion property, less danger of fire and less air pollution.

16 Claims, No Drawings

GELLED HYDROCARBON COMPOSITION

The present invention relates to a gelled hydrocarbon composition useful for combustion devises, such as ignition piston engine, Diesel engine, jet engine, rocket motor, boiler, and furnace. More particularly, it relates to a gelled hydrocarbon composition comprising at least 80 wt. percent (on the basis of the weight of gelled hydrocarbon) of a liquid hydrocarbon having a boiling point of 30° to 390°C as the internal phase, at least 0.05 wt. percent of water as the external phase and at least 0.05 wt. percent of a specific gelling agent, said composition containing the liquid hydrocarbon in extremely high concentration, being able to be stably preserved for a long time even under severe conditions and having excellent properties, such as good combustion property, less danger of fire, and less air pollution (i.e., decrease of nitrogen oxide in the exhaust gas).

The liquid hydrocarbon is a liquid substance and therefore, when a vessel, a transport pipe or combustion devise containing it is injured or upset, the liquid hydrocarbon will rapidly flow out therefrom and spread and/or penetrate. If this takes fire, it will cause a greatest tragedy, as occasionally found in case the crash of an airplane and its destruction by fire, a fire induced by upset of a petroleum stove, destruction by fire of a tanker, and so forth.

For eliminating the defects of the liquid hydrocarbon and preventing such serious accident, it has, recently, been suggested in U.S.A. and other countries to gelate the liquid hydrocarbon. When the liquid hydrocarbon is gelated, it will hardly flow out, and even if it flow out, it does not spread or penetrate. Furthermore, even if it ignites, it can be easily extinguished. Accordingly, it is very important and favorable to gelate the liquid hydrocarbon also from viewpoint of esteem of human life.

There have, hitherto, been known some methods for gelating liquid hydrocarbon. They are classified into two groups; one being gelation by dissolving or dispersing a gelling agent into liquid hydrocarbon and another one being a method for obtaining an emulsion-type gel by mixing a liquid hydrocarbon with water or a polar solvent and a gelling agent. Among these methods, the latter emulsion-type gel is better in its excellent safety and combustion property. A similar method has been adapted to the preparation of yogurt, ice cream, mayonnaise, jelly, grease, cosmetic products or the like. However, contrary to these products, the present gelled composition must satisfy the requirements that the liquid hydrocarbon must be contained in such high concentration as to be able to be used as a fuel and the contents of water and the gelling agent must be as small as possible; the gelling agent and other additive must not lower the combustion property of the hydrocarbon and not cause any air pollution; and further the gel prepared thereby is stable even under the severe conditions, such as transportation by pipe, oscillation or extremely low temperature. A method for obtaining emulsion-type gel fuels has been described in some literatures, such as Japanese Pat. Publication No. 32,582/1971, and U.S. Pat. Nos. 3,352,109, 3,490,237 and 3,586,490. In the method described in Japanese Pat. Publication No. 32,582/1971, the emulsion-type gel has been prepared by using an emulsifier having HLB of 11 to 16, ashless freezing point depressing agent and urea. But, the stability of the gel is inferior and the emulsion will be broken only at about one month. In the method described in U.S. Pat. No. 3,490,237, there have been used various emulsifiers as such gelling agent. However, in the method there has never been studies on the stability of the prepared gels, and moreover the gels contain harmful substances such as sulfur trioxide which causes air pollution. In the method described in U.S. Pat. No. 3,586,490, there has been used a phosphoric acid ester of an aliphatic alcohol added with ethylene oxide as the gelling agent. However, in this method there has never been studies on the stability of the product either, and further, it has defect in that phosphorus is contained as a harmful substance. Furthermore, in the method described in U.S. Pat. No. 3,352,109, there have been used alone various emulsifiers added with an alkylene oxide as the gelling agent. However, there has never been studies on the stability of the products either.

Thus, it has, hitherto, been attempted to prepare an emulsion-type gel of a liquid hydrocarbon by using various gelling agents. According to these methods, however, it is necessary to keep the content of the liquid hydrocarbon within a range of 95 to 97 or less wt. percent for obtaining a gel stable under a rather mild condition, e.g., around room temperature. However, in such range of liquid hydrocarbon content, the emulsion will be broken only by allowing it to stand at room temperature for about one month and revert to the original liquid, i.e., a liquid hydrocarbon, water and a gelling agent. When it is preserved under a severe condition such as at a temperature of −10°C or less, or 40°C or more, it is more unstable and broken only around 10 days. Moreover, when the content of the liquid hydrocarbon rises more than 97 wt. percent for improving the combustion property, the stability of the gelled liquid hydrocarbon will further lower and it will be completely broken within 1 to 7 days. Accordingly, these methods are not still suitable for practical use.

A gelling agent suitable for gelling liquid hydrocarbon should also satisfy various requirements that it can give extremely stable composition; it does not release any air pollution substance such as poisonous gas when it is burned; it does not lower the combustion property of the liquid hydrocarbon; and it is effective in a little amount.

Among the conventional gelling agents, a nonionic surface active agent having polyalkyleneoxide chain containing no sulfur, phosphorus or metal in the molecule has no defect of air polution, such as occurrence of much nitrogen oxide and sulfur trioxide in the exhaust gas, but the liquid hydrocarbon gelated by nonionic surface active agents and water is remarkably inferior in its stability and is readily broken while its preservation or its transportation, e.g., within 10 to 30 days, and results in loss of the essential stability, and therefore it is not suitable for practical use.

Further, it has been known that the liquid hydrocarbon can be gelated by dissolving therein an gelling agent, which may be prepared by condensation of polyvalent alcohol and aldehyde. HOwever, when it is burned, it gives much carbon residue, and further the gel prepared by the gelling agent is too rigid and therefore it is difficult to transport by pipe or to burn by spraying. The similar conventional gelling agents, such as polyisobutylene, polyisobutene, dioctyl phthalate, and lauryl methacrylatehydroxypropyl methacrylate copolymer also cause the lowering of the combustion property. Further, metallic soap has been also used as a gelling agent, but the gel prepared thereby is easily affected by moisture in atmosphere due to its high metal content and remarkably unstable and further it gives much ashes when it is burned. Accordingly, such gelling agent is not suitable for practical use either.

Under the circumstances, studies have been made for a long time to find out a gelled hydrocarbon composition having none of the defects above-mentioned and being extremely stable and valuable for practical use, and, it has now been found out that the desired gelled hydrocarbon composition can be produced by emulsifying a liquid hydrocarbon with a small amount of a specific gelling agent and water.

An object of the present invention is to provide a novel gelled hydrocarbon composition useful for various combustion devices.

Another object of the invention is to provide a gelled hydrocarbon composition being extremely stable and having excellent combustion property, less danger of fire and less air pollution (i.e., decrease of nitrogen oxide in the exhaust gas).

A further object of the invention is to provide a novel gelling agent useful for gelating a liquid hydrocarbon.

These and other object will be apparent from the description hereinafter.

According to the present invention, there can be produced the desired gelled hydrocarbon composition having the following components:
a. at least 80 wt. percent (on the basis of the weight of gelled hydrocarbon; hereinafter the same) of a liquid hydrocarbon having a boiling point of 30° to 390°C as a internal phase,
b. at least 0.05 wt. percent of water as a external phase, and
c. at least 0.05 wt. percent of a specific gelling agent.

This is, it can be prepared by dissolving or homogeneously mixing small amount of the gelling agent into water and adding gradually thereto the liquid hydrocarbon with agitation and thereby gelating the mixture to give a gel containing finally 99.6 wt. percent of the liquid hydrocarbon.

The liquid hydrocarbon used in the present invention may be, for example gas oil, kerosene, gasoline, aviation gasoline, other petroleum distillate, hydrocarbon fuel produced from coal tar solvent, naphtha, benzene, xylene or liquid hydrocarbon produced from coal gas, and coal tar hydrocarbon. These liquid hydrocarbon can give a stable gelled product in an amount of at least 80 wt. percent, but when the gel is used as fuel, the higher concentration of the hydrocarbon gives better product. According to the present invention, there can be obtained the product having concentration as high as 99.6 wt. percent which has never been produced by the conventional gelling agents (the maximum concentration of the conventional product was 95 to 97 wt. percent). The suitable concentration of the liquid hydrocarbon is within a range of 80 to 99.6 wt. percent, preferably about 95.0 to 99.4 wt. percent for obtaining valuable gelled product being stable even under severe conditions.

The water contained as the external phase may be preferably within a range of 0.05 to 19 wt. percent. When the gelled hydrocarbon is used as fuel, less amount of water gives better effect.

The gelling agent of the invention is a member selected from the group consisting of i. a gelling agent having the following formula (I), alone or mixture thereof with other gelling agent:

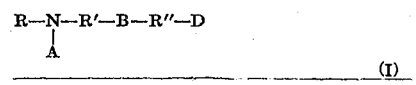

wherein R, R' and R'' are alkyl group having 1 to 50 carbon atoms or $(CH_2)_p$ wherein p is an integer of from 0 to 50, inclusive; A is hydrogen, R'B, R, R''', $RNH_2$, $R'''NH_2$ or R'''D wherein R''' is alkyl group having 1 to 50 carbon atoms or $(CH_2)_q$ and q is an integer of from 0 to 50, inclusive; B is $[(CH_2)_mNH]_n$ wherein m and n are an integer of from 0 to 50, inclusive; D is COOH or its inorganic or organic salt, and ii. a mixture of a nonionic surface active agent having polyalkyleneoxide chain in the molecule and a carboxylic acid or its salts.

The suitable examples of the gelling agent having the formula (I) are the compounds of the following formulae and their salts.

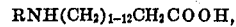

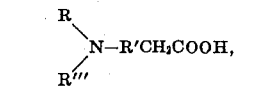

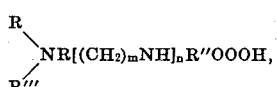

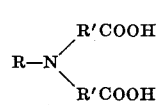

and

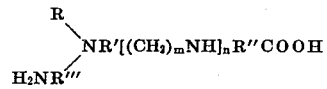

wherein R, R', R'', and R''' are alkyl group having 1 to 50 carbon atoms or $(CH_2)_p$ wherein p is an integer of from 0 to 50, inclusive; and m and n are an integer of from 0 to 50, inclusive. As the salt of the gelling agent having formula (I), there may be a salt with an organic or inorganic base (e.g., sodium, potassium, calcium or magnesium salt, or salt with an amine mentioned hereinafter), but amine salt may be more preferable.

The mixture of the gelling agent of the formula (I) is also suitable for making the stable gel and may be, for example, a mixture thereof with 90 to 10 wt. percent, preferably 50 to 10 wt. percent of other gelling agent selected from the one containing amido bond (—CON—) in the molecule (e.g., lauric acid diethanolamide, or oleic acid monoethanolamide) and the one containing carboxyl group or its salt (e.g., oleic acid, lauric acid or octylic acid, or its salt) and/or other nonionic surface active agent as mentioned hereinafter or other cationic surface active agent.

The nonionic surface active agent having polyalkyleneoxide chain in the molecule used for the mixture (ii) may be the one of the following formula:

$$Z[(OR)_nOH]_m$$

wherein Z is a group being able to be oxyalkylate, OR is alkylene oxide (e.g., ethylene oxide, propylene oxide, butylene oxide, or epichlorohydrin), n is 1 to 2,000 or more, inclusive which is determined according to the degree of the polymerization of alkyleneoxide, and m is a numeral determined according to the number of the functional group included in the group being able to be oxyalkylated, i.e., Z, for instance, when Z is monofunctional substance, such as alcohol or phenol m is 1, when Z is water, glycol or the like, m is 2, and when Z is glycerol or the like, m is 3.

The suitable examples of the group being able to be oxyalkylated defined by Z are

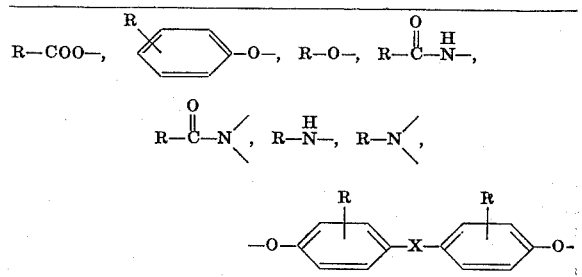

wherein X is O, S, SO or the like and R is an alkyl, —O—(alkylene oxide block copolymer or the like), polyvalent alcohol derivative (e.g., glycerol, glucose, pentaerythritol, sorbitan, sorbitol, or the like), or polycarboxylic acid derivatives.

For addition of alkylene oxide to such group being able to be oxyalkylated, it may be added with only ethyleneoxide, or it may be copolymerized with ethylene oxide and other alkylene oxide. The copolymer has the following two types of structure, i.e., random copolymer and block copolymer:

—BB—A—BB—AA—BBABABBABBBB— (random copolymer)

—BBBB—AAAA—CCC—AAAAA—BBB— (block copolymer)

wherein A is one of alkyleneoxide such as ethylene oxide, B is an alkylene oxide, and C is other alkylene oxide other than those of A and B.

These nonionic surface active agents have been described in many literature articles, for instance, in "Surface Active Agents and Detergents, Vol. 1 and Vol. 2" or "Interscience Publishers, Vol. 1, 1949 and Vol. 2, 1958," and are well known by persons skilled in the art.

The carboxylic acid or its salt to be admixed with above nonionic surface active agent may be monocarboxylic acid having one carboxyl group (e.g., oleic acid, lauric acid, octylic acid, or propionic acid) dicarboxylic acid having two carboxyl groups (e.g., oxalic acid, succinic acid, fumaric acid, sebacic acid, or adipic acid), polycarboxylic acid having three or more carboxyl groups (e.g., EDTA, polyacrylic acid, or polymethacrylic acid), or hydroxycarboxylic acid having hydroxy and carboxyl groups (e.g., tartaric acid, citric acid, gluconic acid, or glycolic acid), or a salt thereof with an alkali metal (e.g., sodium or potassium) or an organic primary, secondary or tertiary amine or a quaternary ammonium compound as mentioned hereinafter. These may be used alone or in mixtures thereof.

The nonionic surface active agent having a polyalkyleneoxide chain and the carboxylic acid or its salt may be mixed in a proportion of 9 : 1 to 1 : 9, preferably 3 : 7 to 5 : 5 and the mixture is used as a gelling agent.

When the mixture is used as a gelling agent in the present composition, there can be obtained extremely excellent gelled hydrocarbon composition which can not at all be obtained by using the nonionic surface active agent or carboxylic acid or its salt alone. The gelling agent may be preferably used in an amount of the range of 0.05 to 19 wt. percent, more preferably 0.1 to 10 wt. percent.

According to the present invention, it has been also found that when the gelling agent of formula (I), alone or mixture thereof is used as the component (c), an amine compound can be also admixed in addition to the above component (a), (b) and (c) to give a high concentrated gel having more excellent stability. The amine compound is added in the mixture of the components (b) and (c) before the addition of the component (a): liquid hydrocarbon and mixed homogeneously with the components (b) and (c), and then the liquid hydrocarbon is added thereto in the same manner as described above to give a gel containing finally 99.6 wt. percent of the liquid hydrocarbon which is extremely stable even under severe conditions. The amine compound can be admixed by replacing with an optional amount of the (b) component: water, and the amount of the amine compound may be within a range of 0.05 to 19 wt. percent, more preferably 0.1 to 10 wt. percent. The amine compound may be added by premixing with the gelling agent of formula (I). In this case, a part or whole of the amine compound may form a salt with the gelling agent as mentioned hereinbefore.

The amine compound may be inclusive various kinds of amines and classified into four groups, i.e., primary amine having the group —NH$_2$, secondary amine having the group

tertiary amine having the group

and quaternary ammonium compound. The suitable examples of the amine compounds may be monoalkylamine (e.g., methylamine, ethylamine, propylamine, butylamine, hexylamine, octylamine, or laurylamine), dialkylamine(e.g., dimethylamine, diethylamine, ethylmethylamine, dihexylamine, or dioctylamine), trialkylamine (e.g., trimethylamine, or triethylamine) quaternary ammonium compound (e.g., trimethyllauryl ammonium), monoethanolamine, diethanolamine, triethanolamine, aminoethylaminoethanol, diethylenetriamine, hexaethylenepentamine, dicyandiamide, quanidine or its salt, dicyclohexylamine, and polyethylenepolyamine having the polymerization degree of 5 to 60.

The examples of each component disclosed above are merely the representative ones, and it will be readily understood by persons skilled in the art that other examples of the components can be also useful in the present invention. Furthermore, the present composition can be also admixed with one or more other additives, such as anti-freeze (e.g., ethylene glycol, propylene glycol, or diethylene glycol), various corrosion inhibitors, biocides, anti-knock compositions, various detergents, and colorants, unless they affect unfavorably the stability of the gelled composition.

The gelled hydrocarbon compositions of the present invention are extremely superior in their stability with repsect to the conventional products, especially in their stability on storage at low temperature; they do not generate any harmful gas when burned; do not essentially lower the combustion property of the liquid hydrocarbon since the content of the liquid hydrocarbon is very high; and further can be transported by pump or burned by spraying, since it has appropriate flexibility. Moreover, the present composition is oil-in-water type emulsion and therefore in an electric conductor, and thus there is no problem of ignition induced by static electricity which is a serious problem in case of the transportation of liquid hydrocarbon. Thus, the present gelled hydrocarbon composition has superior properties in comparison with the conventional products.

Although it has not been made clear why such stable gelled composition having high contents of liquid hydrocarbon can be obtained by using the gelling agent of the present invention, it may be supposed as follows: that is, the gelling agent combines electrically between the nitrogen atom and carboxyl group in the molecules in case of the gelling agent of formula (I) and carboxyl group or amino group combines strongly with water and thereby the small amount of water involving the gelling agent forms a stable aqueous membrane enclosing the particle of the liquid hydrocarbon, and the gelled hydrocarbon composition is extremely stable for a long time even under severe conditions, or, in the case of a mixture of nonionic surface active agent and the carboxylic acid or its salt, the nonionic surface active agent combines static-electrically with the carboxylic acid or its salt and then the carboxyl group included in the product thus combined fixes strongly the water. Further the reason that more stable gelled composition can be obtained by adding the amine compound to the composition may be supposed as follows: that is, the amine compound combines with the carboxyl group contained in the gelling agent and further the amino group of the amino compound combines with water and thereby the water and the gelling agent are strongly combined with each other to form stable aqueous membrane enclosing the liquid hydrocarbon.

When the gelled hydrocarbon admixed with 2 to 20 wt. percent of water and a small amount of the gelling agent is used as a fuel for Diesel engine or the like, the flame temperature is lowered by the water content and thereby the volume of nitrogen oxide in the exhaust gas is decreased about 30 to 50 percent in comparison with the original liquid hydrocarbon which is not gelated.

The gelled hydrocarbon composition of the present invention comprises the components as mentioned above and contains the hydrocarbon in extremely high concentration, and further shows superior stability of the gel and therefore can be stably preserved for a long time even under severe conditions. Furthermore, in the molecule of the gelling agents used for the present composition there is no element which causes the occurrence of harmful gas when it is burned, and therefore, the present gelled hydrocarbon composition is valuable for industrial use without regard to air pollution.

The present invention is illustrated by the following examples but not limited thereto.

EXAMPLE 1

A gelled hydrocarbon composition was prepared by using water as the external phase, kerosene as the internal phase and gelling agents as mentioned below:

a. $C_{12}H_{25}NHC_2H_4COOH$
b. $C_{12}H_{25}NHC_2H_4NHC_2H_4COOH$
c. $C_{14}H_{29}N(CH_3)C_2H_4COOH$
d. $(C_8H_{17})_2NC_2H_4NHC_5H_{10}COOH$
e. 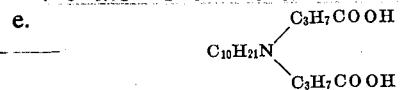

f. the ammonium salt of the gelling agent of (a)
g. the sodium salt of the gelling agent of (e)
h. a mixture of the gelling agent of (a) and $C_9H_{19}CONHC_2H_4OH$ (the proportion is 8 : 2, 5 : 5 or 3 : 7)
i. a mixture of the gelling agent of (c) and

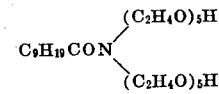

(the proportion is 8 : 2, or 5 : 5)
j. a mixture of the gelling agent of (d) and

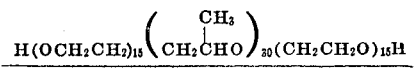

(the proportion is 8 : 2, or 5 : 5)
k. a mixture of the gelling agent of (e) and $C_{11}H_{23}COOH$ (the proportion is 8 : 2, or 5 : 5), and
l. a mixture of the gelling agent of (a) and $C_{12}H_{25}O(C_2H_4O)_{10}H$ (the proportion is 8 : 2, 5 : 5, or 3 : 7).

As controls, gelled hydrocarbon was prepared by using conventional gelling agents.

The gelling agent was well dissolved into or mixed with water, and the mixture was added to a beaker, and thereto was gradually added kerosene with rising the addition amount thereof within a fixed period, with agitation by a slow agitator with stainless steel agitating blade, to give the desired gel having high concentration of liquid hydrocarbon, on which the consistency was measured in accordance with the provision of JIS K–2809 (ASTM D–217), and further the stability was measured by the degree of separation of the gelled liquid hydrocarbon under three specified conditions. The results are shown in Table 1.

Table 1

| Components of the gel (% by weight) | | | Stability (separated volume: %) | | | Consistency |
|---|---|---|---|---|---|---|
| Kerosene | Gelling agent*[1] | Water | Frozen – High temp.*[2] | Low temp.*[3] | Room temp.*[4] | |
| The present products: | | | | | | |
| 99 | 0.4   (a) | 0.6 | 0.5 | 0.0 | 0.0 | 430 |
| do. | do.    (b) | do. | 0.0 | 0.0 | do. | 445 |
| do. | do.    (c) | do. | 0.5 | 0.0 | do. | 425 |
| do. | do.    (d) | do. | 0.5 | 0.0 | do. | 460 |
| do. | do.    (e) | do. | 1.5 | 0.0 | do. | 470 |
| do. | do.    (f) | do. | 1.5 | 0.0 | do. | 470 |

Table 1 —Continued

| Components of the gel (% by weight) | | | Stability (separated volume: %) | | | Consistency |
|---|---|---|---|---|---|---|
| Kerosene | Gelling agent*1 | Water | Frozen — High temp.*2 | Low temp.*3 | Room temp.*4 | |
| do. | do. | (g) | do. | 0.0 | 0.0 | do. | 440 |
| do. | do. | (h, 8 : 2) | do. | 0.0 | 0.0 | do. | 465 |
| do. | do. | (h, 5 : 5) | do. | 0.5 | 0.0 | do. | 445 |
| do. | do. | (h, 3 : 7) | do. | 2.0 | 3.0 | do. | 435 |
| do. | do. | (i, 8 : 2) | do. | 1.0 | 0.0 | do. | 460 |
| do. | do. | (i, 5 : 5) | do. | 1.0 | 0.0 | do. | 440 |
| do. | do. | (j, 8 : 2) | do. | 0.0 | 1.2 | do. | 440 |
| do. | do. | (j, 5 : 5) | do. | 2.0 | 0.0 | do. | 445 |
| The present products: | | | | | | | |
| 99 | 0.4 | (k, 8 : 2) | 0.6 | 0.5 | 0.0 | 0.0 | 435 |
| do. | do. | (k, 5 : 5) | do. | 0.5 | 0.0 | do. | 415 |
| do. | do. | (l, 8 : 2) | do. | 0.5 | 0.0 | do. | 435 |
| do. | do. | (l, 5 : 5) | do. | 1.0 | 0.0 | do. | 440 |
| do. | do. | (l, 3 : 7) | do. | 1.5 | 2.0 | do. | 445 |
| Conventional products: | | | | | | | |
| 97 | 1 | (m) | 2 | 91 | 27 | 4 | 380 |
| do. | do. | (n) | do. | 94 | 63 | 14 | 440 |
| do. | do. | (o) | do. | 71 | 90 | 64 | 390 |
| do. | do. | (p) | do. | 9 | 2 | 0 | 370 |
| do. | do. | (q) | do. | 45 | 19 | 0 | 405 |

[Remarks] In Table 1, the star marks have the following meanings:

*1) (a) to (l): The gelling agents of the present invention mentioned above. The numerals in the parentheses mean the proportion. (m) to (q) are conventional gelling agents as follows:
(m): Dodecylphenol polyethyleneoxide additive ($\overline{P} = 10$ (n): Polyoxyethylene sorbitan monooleate ($\overline{P} = 30$) (o): Polyoxyethylene oleyl ether ($\overline{P} = 10$) (p): Condensate of stearic acid and diethanolamine (q): 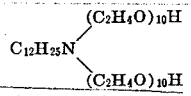

*2) The gelled product was kept at 60°C for 6 hours and then cooled at -20°C for 18 hours and again was kept at 60°C for 6 hours. This cycle was repeated 20 times, and then the degree of separation of the gelled liquid hydrocarbon was measured.
*3) The gelled product was kept at -20°C for 60 days, and then the degree of separation of the gelled liquid hydrocarbon was measured.
*4) The gelled product was kept at 25°C for 90 days, and then the degree of separation of the gelled liquid hydrocarbon was measured.

As made clear from the results shown in Table 1, the gelled hydrocarbon composition of the present invention showed superior stability, even if the contents of the liquid hydrocarbon was as high as 99 percent, in comparison with the conventional product (the concentration: 97 percent). Further, the present compositions had a consistency between 415 to 470 (the larger in the numeral is the softer) and could be transported by pump.

EXAMPLE 2

Some of the gelled hydrocarbon compositions of the present invention prepared in Example 1 and kerosene alone were burned by gun type burner (Pressure spray type, spray pressure: 10 kg/cm²) of hot water boiler, and then the concentration of smoke was measured by Bacharach Smoke Meter and further the components of the combustion gas were analyzed by gas chromatography. The results are shown in Table 2.

Table 2

| Fuel | Speed of fuel consume (liter/hour) | Concentration of smoke | Components of combustion gas (in dry state) | | |
|---|---|---|---|---|---|
| | | | Carbon dioxide (vol: %) | Oxygen (vol: %) | Carbon monoxide (vol: %) |
| Kerosene | 4.5 | 0 | 11.5 | 6.5 | 0.0 |
| Gelled hydrocarbon composition of the invention | 4.5 | 0 | 11.2 – 11.8 | 6.3 – 6.6 | 0.0 |
| Kerosene | 4.5 | 2* | 13.0 | 5.0 | 0.0 |
| Gelled hydrocarbon composition of the invention | 4.5 | 2* | 12.8 – 13.3 | 4.8 – 5.2 | 0.0 |

[Remark] *) Air flowing volume was decreased.

As is made clear from the results shown in Table 2, the gelled hydrocarbon composition of the present invention showed similar combustion property to that of the kerosene, and further the present product is extremely decreased in its fluidity and therefore, even if the tank containing the product is upset or injured by earthquake or the like, the outflow of the fuel is inhibited and therefore the product is very safe.

EXAMPLE 3

The gelled hydrocarbon composition of the present invention prepared in Example 1 and kerosene alone were charged in a burner of pot type hot water boiler with a gear pump for fuel supply and then ignited by conventional electric heated and burned for 20 hours, while the combustion property thereof was studied. The results are shown in Table 3.

Table 3

| Fuel | Speed of fuel consume (liter/hour) | Concentration of smoke | Carbon accumulated in pot | |
|---|---|---|---|---|
| | | | Bottom of pot (g) | Upper part of pot (g) |
| Kerosene | 2.0 | 0 | 2.0 | 16 |
| Gelled hydrocarbon composition of the invention | 2.0 | 0 | 1.5–2.5 | 10–15 |
| Conventional gelled | | | | |

Table 3-Continued

| Fuel | Speed of fuel consume (liter/hour) | Concentration of smoke | Carbon accumulated in pot | |
|---|---|---|---|---|
| | | | Bottom of pot (g) | Upper part of pot (g) |
| hydrocarbon composition of the invention | 2.0 | 0 | 5.0–10.0 | 12–20 |

As is clear from the results shown in Table 3, the combustion property of the present product was similar or superior to that of kerosene and extremely superior to that of the conventional products also when they were burned by pot type burner, the same as in case of burning by spray.

As mentioned above, in accordance with the test results of solidity of the gel, stability and combustion property, the gelled hydrocarbon compositions of the present invention were extremely stable without any lowering of the combustion property of kerosene itself.

On the other hand, the conventional products were inferior in the stability even in rather lower concentration as 97 percent, as shown in Table 1, and when it had the same concentration as (99 percent) as the present product of Example 1, the gel was broken to separate into kerosene, water and the gelling agent by allowing to stand at room temperature for merely 10 to 20 days and further in the conventional products, the carbon accumulated in the pot was much, and therefore such products are hardly applied for practical use.

Accordingly, it will be made clear that the gelled products of the invention is extremely superior to the conventional products.

EXAMPLE 4

By using some of the present gelled hydrocarbon compositions prepared in Example 1, the gelled jet fuel was prepared in the same manner as described in Example 1.

The comparative tests of the stability and consistency between the present products and the conventional products were performed in the same manner as described in Example 1, from a viewpoint of studying the adaptability for the practical use. The results are shown in Table 4.

As made clear from the results as shown in Table 4, the four gelled products of the present invention showed extremely superior stability to that of the conventional products, and could be stably preserved for a long time under severe conditions. Further, the present products had an appropriate consistency (460 to 410) and therefore, could be transported by pump.

On the other hand, the conventional products readily broke merely by allowing them to stand at room temperature and further the consistency of the products was 405 to 380 (very hard) and therefore the products were not suitable for the practical use.

EXAMPLE 5

The spraying and combustion properties of the present gelled hydrocarbon products and conventional products prepared in Example 4 and the jet fuel alone were studied by using a model of a small spiral spray type, jet engine. When the spray pressure was 5 kg/cm$^2$ or more, all gelled hydrocarbon compositions of the present invention showed similar spraying property to that of jet fuel alone, and also showed excellent combustion property when the spray was ignited. On the other hand, the conventional products were too hard and therefore it was incomplete or impossible to spray them.

Moreover, the spreading speed of flame in the present gelled hydrocarbon compositions and jet fuel alone was measured by using a stainless steel butt having 10 cm in width, 100 cm in length and 2 cm in depth, in which the test products were fulfilled. The spreading speed of flame of each product of the present invention was 5 to 10 cm/sec which was one-tenth of that of jet fuel alone (130 cm/sec). This fact means that when an airplane makes an emergency landing, the passengers can escape before the spread of flame.

EXAMPLE 6

The present gelling agents used in Example 1 and an amine compound were added to a fixed amount of water. After agitating well, the mixture was added gradually to gas oil to give gelled gas oil in the same manner as described in Example 1, of which the stability and consistency were measured in comparison with the conventional products. The results are shown in Table 5.

Table 4

| Components of the gel (% by weight) | | | Stability (separated volume: %) | | | Consistency |
|---|---|---|---|---|---|---|
| Jet fuel | Gelling agent | Water | Frozen — High temp. | Low temp. | Room temp. | |
| The present products: | | | | | | |
| 99.5 | 0.1 (a) | 0.4 | 7.1 | 0 | 0 | 460 |
| 99.0 | 0.2 (d) | 0.8 | 0.5 | 0 | 0 | 455 |
| 99.2 | 0.2 (i) | 0.6 | 1.7 | 0 | 0 | 440 |
| 99.4 | 0.2 (1, 8:2) | 0.4 | 2.7 | 7.2 | 0 | 415 |
| Conventional products: | | | | | | |
| 99.0 | 0.3 (q) | 0.7 | 100 | 77 | 31 | 405 |
| 97.0 | 1.0 (m) | 2.0 | 100 | 65 | 17 | 380 |

Table 5

| Components of the gel (% by weight) | | | | Stability (separated volume: %) | | | Consistency |
|---|---|---|---|---|---|---|---|
| Gas oil | Gelling agent | Amine | Water | Frozen — High temp. | Low temp. | Room temp. | |
| The present products: | | | | | | | |
| 99.2 | a 0.2 | diethylenetriamine | 0.2 | 0.4 | 0 | 0 | 0 | 440 |
| 98.1 | c 0.4 | triethylenetetramine | 0.5 | 1.0 | 0 | 0 | 0 | 460 |
| 99.5 | e 0.1 | monoethanolamine | 0.1 | 0.2 | 0.3 | 0.8 | 0 | 420 |
| 99.0 | f 0.3 | triethanolamine | 0.2 | 0.5 | 0 | 0 | 0 | 445 |
| 98.9 | h (8:2) 0.3 | aminoethylethanolamine | 0.3 | 0.5 | 0 | 0 | 0 | 470 |

Table 5 — Continued

| Gas oil | Components of the gel (% by weight) Gelling agent | Amine | | Water | Stability (separated volume: %) Frozen — High temp. | Low temp. | Room temp. | Consistency |
|---|---|---|---|---|---|---|---|---|
| 99.3 | j (8:2) 0.2 | diethanolamine | 0.1 | 0.4 | 2.1 | 0.4 | 0 | 450 |
| 99.0 | k (8:2) 0.3 | dimethylethanolamine | 0.1 | 0.6 | 1.0 | 0 | 0 | 465 |
| 95.0 | a 0.1 | diethanolamine | 0.1 | 4.8 | 1.0 | 0 | 0 | 470 |
| 95.0 | c 0.1 | monoethanolamine | 0.1 | 4.8 | 1.5 | 0 | 0 | 470 |
| 90.0 | e 0.1 | diethanolamine | 0.1 | 4.8 | 1.5 | 0 | 0 | 470 |
| 90.0 | f 0.1 | triethanolamine | 0.1 | 4.8 | 1.0 | 0 | 0 | 470 |
| 98.0 | a 0.2 | guanidine | 0.1 | 1.7 | 0 | 0 | 0 | 450 |
| 98.0 | e 0.1 | dicyandiamide | 0.1 | 1.8 | 0 | 0 | 0 | 455 |
| 97.0 | l (3:7) 0.2 | dicyclohexylamine | 0.1 | 2.7 | 0 | 0 | 0 | 460 |
| Conventional products: | | | | | | | | |
| 99.0 | m 0.3 | — | | 0.7 | 100 | 86 | 100 | 390 |
| 97.0 | p 1.0 | — | | 2.0 | 100 | 27 | 5 | 370 |

As made clear from the results shown in Table 5, the gelled products of the present invention, when an amine compound was used together, showed more excellent properties, and could be contained higher concentration of gas oil in comparison with the conventional products (the gelled product containing finally 99.6 wt. percent of gas oil can be obtained, but it is preferable to include 98 to 99.4 or less wt. percent of gas oil for practical use), and further the present gelled products were extremely stable and the consistency thereof could be optionally controlled within a range of 380 to 460 by controlling the amounts of the gelling agent and the amine compound within a range of 0.05 sto 20 wt. percent. Moreover, by using slight amount of the present gelling agent, there was obtained the gelled gas oil, in which rather large amount of water was included (2 to 20 wt. percent) for lowering the amount of nitrogen oxide in the exhaust gas of Diesel engine.

EXAMPLE 7

The combustion property of the gelled hydrocarbon compositions containing 90 to 98 wt. percent of gas oil and rather large amount of water prepared in Example 6 and gas oil alone was tested by using Diesel engine. The results are shown in Table 6.

Table 6

| Fuel | Water (Wt %) | Speed of fuel consume | Concentration of smoke | Components of combustion gas (in dry state) | | | |
|---|---|---|---|---|---|---|---|
| | | | | Carbon dioxide (vol. %) | Oxygen (vol. %) | Carbon monoxide (vol. %) | Nitrogen oxide (ppm) |
| Gas oil | 0.0 | 1.20 | 2.5 | 7.5 | 11.0 | 0.02 | 800 |
| Gelled light oil of the present invention | 2.1 | 1.20 | 1.0 | 7.4 | 11.0 | 0.02 | 630 |
| do. | 4.8 | 1.25 | 0.5 | 7.4 | 11.0 | 0.02 | 550 |
| do. | 9.8 | 1.30 | 0.5 | 7.4 | 10.9 | 0.02 | 500 |

As made clear from the results shown in Table 6, the gelled hydrocarbon compositions of the present invention showed decrease in the concentration of smoke and the amount of nitrogen oxide in the combustion gas in comparison with gas oil alone. The reasonn thereof is not made clear, but it will be probably owing to function of water.

The effects of decrease in the concentration of smoke and nitrogen oxide emission by the present gelling agent can be useful not only for gas oil as above example but also for various other liquid hydrocarbons, and therefore, the gelled products of the present invention are valuable for practical use, especially in these days that the air pollution becomes most serious problem.

EXAMPLE 8

Gelled hydrocarbon compositions were prepared by using water as the external phase, kerosene as the internal phase and gelling agents (A) to (K) as mentioned below:

A. a mixture of $C_{12}H_{25}—O—(CH_2CH_2O)_{10}H$ and octylic acid (the proportion is 9 : 1 or 5 : 5)

B. a mixture of $C_{18}H_{37}—O—(CH_2CH_2O)_{10}H$ and diethanolamine laurate (the proportion is 3 : 7)

C. a mixture of $C_8H_{17}-O-(C_3H_7O)_{15}-(CH_2CH_2O)_{15}H$ and tartaric acid (the preparation is 8 : 2, 5 : 5 or 2 : 8)

D. a mixture of

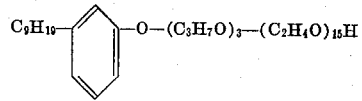

and adipic acid (the proportion is 5 : 5 or 2 : 8)

E. a mixture of $C_8H_{17}COO—(C_4H_8O)_4—(C_2H_4O)_{15}H$ and succinic acid (the proportion is 5 : 5 or 3 : 7)

F. a mixture of

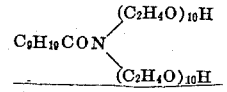

and acrylic acid (the proportion is 8 : 2)

G. a mixture of polyoxyethylene sorbitan monooleate (P = 16) and sebacic acid (the proportion is 8 : 2 or 5 : 5)

H. a mixture of $C_{18}H_{37}—NH—(C_2H_4O)_{15}H$ and citric acid (the proportion is 5 : 5)

I. a mixture of $H(OH_4C_2)_{10}—O—(C_4H_8O)_{10}—(C_2H_4O)_{10}H$ and gluconic acid (the proportion is 8 : 2)

J. a mixture of $H(OH_4C_2)_{10}—O—(C_3H_7O)_5—(C_4H_8O)_5—(C_3H_7O)_5—(C_2H_4O)_{10}H$ and oxalic acid (the proportion is 5 : 5 or 3 : 7), and K. a mixture of

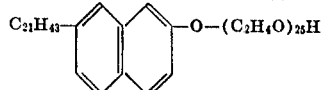

and EDTA (the proportion is 5 : 5).

As controls, gelled hydrocarbon were prepared by using conventional gelling agents (L) to (P) as mentioned below:

L. polyoxyethylene dodecylphenyl ether (P = 10)
M. polyoxyethylene sorbitan monooleate (P = 16)
N. polyoxyethylene oleyl ether (P = 15)
O. a condensate of stearic acid and diethanolamine, and
P. 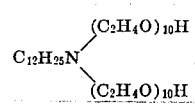

The gelling agent was well dissolved into or mixed with water, and the mixture was added to a beaker at room temperature and at atmospheric, and thereto was gradually added to kerosene by making increments thereof over a fixed period, with agitation by a slow agitator with stainless steel agitating blade (200 r.p.m.), to give the desired gel having high concentration of liquid hydrocarbon, on which the consistency was measured in accordance with the provisions of ASTM D-217 and further the stability was measured under three specified conditions. The results are shown in Table 7.

As made clear from the results shown in Table 7, the gelled hydrocarbon compositions of the present invention showed superior stability, even if the contents of the liquid hydrocarbon was so high as 99 percent, in comparison with the conventional products (the concentration: 97 percent). Further, the present compositions had a consistency between 415 to 470 (the larger in the numeral is the softer) and could be transported by pipe.

EXAMPLE 9

Some of the gelled hydrocarbon compositions of the present invention prepared in Example 8 and kerosene alone were burned by gun type burner (pressure spray type, spray pressure: 10 kg/cm$^2$) of hot water boiler, and then the concentration of smoke was measured by Bacharach Smoke Meter and further the components of the combustion gas were analyzed by gas chromatography. The results are shown in Table 8.

As made clear from the results shown in Table 8, the gelled hydrocarbon compositions of the present invention showed similar combustion property to that of the kerosene, and were kept stably even in a long preserva- Table 7

| Components of the gel (% by weight) | | | Stability (separated volume: %) | | | Consistency |
|---|---|---|---|---|---|---|
| Kerosene | Gelling agent*1 | Water | Frozen — High temp.*2 | Low temp.*3 | Room temp.*4 | |
| The present products: | | | | | | |
| 99.0 | 0.2 (A, 9 : 1) | 0.8 | 0.0 % | >180$^{days}$ | >365$^{days}$ | 445 |
| 98.5 | 0.3 (B, 3 : 7) | 1.2 | 0.0 | >180 | >365 | 460 |
| 99.2 | 0.2 (C, 8 : 2) | 0.6 | 0.5 | 150 | 280 | 445 |
| 98.8 | 0.2 (C, 5 : 5) | 1.0 | 0.0 | >180 | >365 | 455 |
| 97.5 | 0.4 (E, 5 : 5) | 2.1 | 0.0 | >180 | >365 | 460 |
| 98.9 | 0.2 (F, 8 : 2) | 0.9 | 0.0 | >180 | >365 | 450 |
| 99.4 | 0.1 (G, 5 : 5) | 0.5 | 1.3 | 140 | 270 | 435 |
| 98.4 | 0.3 (I, 8 : 2) | 1.3 | 0.0 | >180 | >365 | 450 |
| 99.1 | 0.2 (J, 5 : 5) | 0.7 | 1.2 | 180 | 340 | 445 |
| Conventional products: | | | | | | |
| 97.0 | 1.0 (L) | 2.0 | 91.0 % | 15$^{days}$ | 30$^{days}$ | 380 |
| do. | 1.0 (M) | 2.0 | 94.0 | 7 | 30 | 440 |
| do. | 1.0 (N) | 2.0 | 71.0 | 3 | 35 | 390 |
| do. | 1.0 (O) | 2.0 | 9.0 | 35 | 45 | 370 |
| do. | 1.0 (P) | 2.0 | 45.0 | 21 | 60 | 405 |

[REMARKS] In Table 7, the star marks have the following meanings:
*1) (A) to (P): The gelling agents mentioned above. The numerals in the parentheses mean the proportion.
*2) The gelled product was kept at 60°C for 6 hours and then cooled at −20°C for 18 hours and again was kept at 60°C for 6 hours. This cycle was repeated 20 times, and then the degree of separation of gelled liquid hydrocarbon was measured. The smaller numeral is more stable.
*3) The gelled product was kept at −20°C, and there was counted the days, for which the product was kept stably. The larger numeral is more stable.
*4) The gelled product was kept at room temperature, and there was counted the days, for which the product was kept stably. The larger numeral is more stable.

Table 8

| Fuel | Speed of fuel consume (liter/hour) | Concentration of smoke | Components of combustion gas (in dry state) | | |
|---|---|---|---|---|---|
| | | | Carbon dioxide (vol: %) | Oxygen (vol: %) | Carbon monoxide (vol: %) |
| Kerosene | 4.5 | 0 | 10.5 | 6.5 | 0.0 |
| Gelled hydrocarbon composition of the invention | 4.5 | 0 | 10.2 – 10.8 | 6.4 – 6.8 | 0.0 |
| Kerosene | 4.5 | 2* | 11.5 | 5.0 | 0.0 |
| Gelled hydrocarbon composition of the invention | 4.5 | 2* | 11.0 – 11.7 | 4.9 – 5.3 | 0.0 |

[REMARK] *) Air flowing volume was decreased.

tion, and further the present products are extremely decreased in its fluidity and therefore even if the tank containing the product is upset or injured by earthquake or the like, the outflow of the product is inhibited and therefore the product is very safe.

EXAMPLE 10

The gelled hydrocarbon compositions of the present invention prepared in Example 8 and kerosene alone were charged in a burner of pot type hot water boiler with a gear pump for fuel supply and then ignited by conventional electric heater and burned for 20 hours, while the combustion property thereof was studied. The results are shown in Table 9.

Accordingly, it will be made clear that the gelled products of the invention is extremely superior to the conventioanl products.

EXAMPLE 11

By using some of the present gelled hydrocarbon compositions prepared in Example 8, the gelled jet fuel was prepared in the same manner as described in Example 8.

The comparative tests of the stability and consistency between the present products and the conventional products were performed in the same manner as described in Example 8, in viewpoint of studying the adaptability for the practical use. The results are shown in Table 10.

Table 10

| Components of the gel (% by weight) | | | Stability (separated volume: %) | | | | Consistency |
|---|---|---|---|---|---|---|---|
| Jet fuel | Gelling agent | Water | Frozen — High temp. | Low temp. | Room temp. | | |
| The present products: | | | | | | | |
| 99.5 | 0.1 (A, 5 : 5) | 0.4 | 7.6 % | 140 days | | 230 days | 460 |
| 99.0 | 0.2 (C, 2 : 8) | 0.8 | 0.5 | G2S180 | | >365 | 450 |
| 99.2 | 0.2 (D, 5 : 5) | 0.6 | 1.2 | G2S180 | | >365 | 455 |
| 99.4 | 0.2 (K, 5 : 5) | 0.4 | 0.5 | G2S150 | | >365 | 460 |
| Conventional products: | | | | | | | |
| 99.0 | 0.3 (L) | 0.7 | 100 | 3 | | 12 | 405 |
| 97.0 | 1.0 (M) | 2.0 | 100 | 7 | | 25 | 380 |

Table 9

| Fuel | Speed of fuel consume (liter/hour) | Concentration of smoke | Carbon accumulated in pot | |
|---|---|---|---|---|
| | | | Bottom of pot (g) | Upper part of pot (g) |
| Kerosene | 2.0 | 0 | 2.0 | 16 |
| Gelled hydrocarbon composition of the invention | 2.0 | 0 | 1.5–2.5 | 8–14 |
| Conventional gelled hydrocarbon composition of the invention | 2.0 | 0 | 5.0–10.0 | 13–20 |

As made clear from the results shown in Table 9, the combustion property of the present products was similar or superior to that of kerosene and superior to that of the conventional products also when they were burned by a pot type burner, the same as in case of burning by spray.

As mentioned above, in accordance with the test results of solidity of the gel, stability and combustion property, the gelled hydrocarbon compositions of the present invention were extremely stable without any lowering of the combustion property of kerosene itself. On the other hand, the conventional products were inferior in the stability even in rather lower concentration such as 97 percent, as shown in Table 7, and when it had the same concentration (99 percent) as the present product, the gel was broken to separate into kerosene and the gelling agent by allowing to stand for merely 1 to 15 days, and further in the conventional products, the carbon accumulated in the pot was much, and therefore, such products are hardly applied for practical use.

As made clear from the results as shown in Table 10, the four gelled products of the present invention showed extremely superior stability to that of the conventional products, and could be stably preserved for a long time under severe conditions. Further, the present products had an appropriate consistency (460 to 410) and therefore, could be transported by pump. On the other hand, the conventional products readily decomposed only by allowing to stand at room temperature and further the consistency of the products was 405 to 380 (very hard) and therefore the products were not suitable for the practical use.

EXAMPLE 12

The spraying and combustion properties of the present gelled hydrocarbon products and conventional products prepared in Example 11 and the jet fuel alone were studied by using a model of a small spiral spray type, jet engine. When the spray pressure was 5 kg/cm$^2$ or more, all gelled hydrocarbon compositions of the present invention showed similar spraying property to that of jet fuel alone, and also showed excellent combustion property when the spray was ignited. On the other hand, the conventional products were too hard and therefore it was incomplete or impossible to spray them.

Moreover, the spreading speed of flame in the present gelled hydrocarbon compositions and jet fuel alone was measured by using a stainless steel butt having 10 cm in width, 100 cm in length and 2 cm in depth, in which the test products were fulfilled. The spreading speed of flame of each product of the present invention was 5 to 10 cm/sec which was one-tenth of that of jet fuel alone (130 cm/sec). This fact means that when an airplane makes an emergency landing, the passengers can escape before the spread of flame.

EXAMPLE 13

By using some of the gelling agents of the present invention, gelled gas oil was prepared in the same manner as described in Example 8. The stability and consistency of the products were measured in comparison with the conventional products. The results are shown in Table 11.

Table 11

| Components of the gel (% by weight) | | | Stability (separated volume; %) | | | Consistency |
|---|---|---|---|---|---|---|
| Gas oil | Gelling agent | Water | Frozen — High temp. | Low temp. | Room temp. | |
| The present products: | | | | | | |
| 99.2 | 0.2 (D, 2 : 8) | 0.6 | 0.0% | >180 days | >365 days | 450 |
| 98.1 | 0.4 (G, 8 : 2) | 1.5 | 0.0 | >180 | >365 | 460 |
| 99.5 | 0.1 (H, 5 : 5) | 0.4 | 1.5 | 120 | 210 | 440 |
| 97.0 | 0.3 (J, 3 : 7) | 2.7 | 0.0 | 160 | 290 | 455 |
| 90.0 | 0.5 (L, 3 : 7) | 9.5 | 0.0 | >180 | >365 | 465 |
| Conventional products: | | | | | | |
| 99.0 | 0.3 (N) | 0.7 | 100.0 | 4 | 35 | 390 |
| 97.0 | 0.5 (P) | 2.5 | 100.0 | 18 | 45 | 380 |

As made clear from the results shown in Table 11, the five gelled products of the present invention showed more excellent stability than that of the conventional products and could be preserved for a long time and further had an appropriate consistency (460 to 410) and therefore they could be burned by spray. Moreover, by using slight amount of the present gelling agent, there was obtained the gelled gas oil, in which rather large amount of water was included (2 to 20 wt. percent) for lowering the amount of nitrogen oxide in the exhaust gas of Diesel engine.

EXAMPLE 14

The combustion property of the gelled hydrocarbon compositions containing 90 to 97 wt. percent of gas oil and rather large amount of water prepared in Example 13 and gas oil alone was tested by using Diesel engine. The results are shown in Table 12.

Table 12

| Fuel | Water (Wt %) | Speed of fuel consume | Concentration of smoke | Components of combustion gas (in dry state) | | | |
|---|---|---|---|---|---|---|---|
| | | | | Carbon dioxide (vol. %) | Oxygen (vol. %) | Carbon monoxide (vol. %) | Nitrogen oxide (ppm) |
| Gas oil | 0.0 | 1.20 | 2.5 | 7.5 | 11.0 | 0.02 | 800 |
| Gelled light oil of the present invention | 1.5 | 1.20 | 1.0 | 7.4 | 11.1 | 0.02 | 690 |
| do. | 2.7 | 1.20 | 0.5 | 7.3 | 11.2 | 0.02 | 540 |
| do. | 9.5 | 1.30 | 0.3 | 7.3 | 11.2 | 0.02 | 360 |

As made clear from the results shown in Table 12, the gelled hydrocarbon compositions of the present invention showed decrease in the concentration of smoke and the amount of nitrogen oxide in the combustion gas in comparison with gas oil alone. The reason thereof is not clear, but it is probably due to the water.

The effects of decrease in the concentration of smoke and nitrogen oxide emission by the present gelling agent can be useful not only for gas oil as above example but also for various other liquid hydrocarbons, and therefore, the gelled products of the present invention are valuable for practical use, especially now that air pollution has become a most serious problem.

EXAMPLE 15

By using some gelling agents of the present invention mentioned Example 8, there were prepared gelled products of various liquid hydrocarbons such as heavy oil, benzene, and xylene in the same manner as described in Example 8. The gelled products thus obtained showed more excellent stability in comparison with conventional products.

What is claimed is:

1. A gelled hydrocarbon composition comprising essentially at least 80 wt. percent of a liquid hydrocarbon having a boiling point of 30° to 390°C as an internal phase, at least 0.05 wt. percent of water as an external phase and at least 0.05 wt. percent of a gelling agent selected from the group consisting of i. a gelling agent having the following formula (I), alone or mixture of two or more kinds of the gelling agent, or a 9 : 1 to 1 : 9 parts by weight mixture of the gelling agent with a surface active agent having an amide, carboxyl or alkyleneoxide group in the molecule as a hydrophilic group

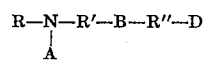

$$R-N(A)-R'-B-R''-D \quad (I)$$

wherein R, R' and R'' are alkyl group or $(CH_2)_p$ wherein $p$ is an integer of from 0 to 50, inclusive; A is hydrogen, R'B, R, R''', $RNH_2$, $R'''NH_2$ or R'''D wherein R''' is alkyl group or $(CH_2)_q$ and $q$ is an integer of from 0 to 50, inclusive; B is $[(CH_2)_mNH]_n$ wherein $m$ and $n$ are an integer of from 0 to 50, inclusive; D is COOH or its inorganic or organic salt, and ii. a 9 : 1 to 1 : 9 by weight mixture of a nonionic surface active agent of the formula:

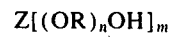

$$Z[(OR)_nOH]_m$$

wherein Z is a group capable of being oxyalkylated, OR is alkyleneoxide, $n$ is 1 to 2,000 or more, inclusive, and $m$ is a numeral determined according to the number of the functional groups of Z, and a water-soluble carboxylic acid or its water soluble salt.

2. The gelled hydrocarbon composition according to claim 1, wherein the gelling agent is the gelling agent having the formula (I), alone or mixture thereof.

3. The gelled hydrocarbon composition according to claim 2, wherein the gelling agent having the formula (1) is a member selected from the group consisting of the compounds of the following formulae and their water-soluble organic or inorganic salts:

$$RNH(CH_2)_{1-12}CH_2COOH,$$

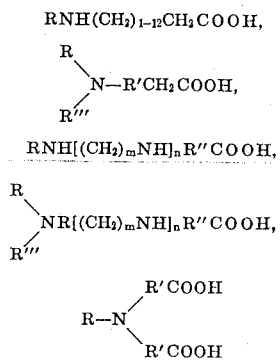

$$RNH[(CH_2)_mNH]_nR''COOH,$$

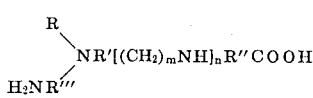

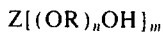

and

wherein R, R', R'' and R''' are alkyl group or $(CH_2)_p$ wherein $p$ is an integer of from 0 to 50, inclusive; and $m$ and $n$ are an integer of from 0 to 50, inclusive.

4. The gelled hydrocarbon composition according to claim 1, wherein the gelling agent is a 1 : 9 to 9 : 1 by weight mixture of the gelling agent of the formula (I) and a surface active agent having an amide, carboxyl or alkyleneoxide group in the molecule as a hydrophilic group.

5. The gelled hydrocarbon composition according to claim 4, wherein the surface active agent having an alkyleneoxide group in the molecule as the hydrophilic group is one of the following formula:

$$Z[(OR)_nOH]_m$$

wherein Z is a group capable of being oxyalkylated, OR is alkyleneoxide, $n$ is 1 to 2,000 or more, inclusive, and $m$ is a numeral determined according to the number of the functional groups of Z.

6. The gelled hydrocarbon composition according to claim 1, wherein the water soluble organic salt of the gelling agent having the formula (I) is a water soluble salt of an amine compound wherein the amine compound is contained in 0.05 to 19 wt. percent on the basis of the weight of the gelled hydrocarbon.

7. The gelled hydrocarbon composition according to claim 6, wherein the amine compound is a member selected from the group consisting of a primary amine, a secondary amine and a tertiary amine.

8. The gelled hydrocarbon composition according to claim 6, wherein the amine compound is a member selected from the group consisting of methylamine, ethylamine, propylamine, butylamine, hexylamine, octylamine, laurylamine, dimethylamine, diethylamine, ethylmethylamine, dihexylamine, dioctylamine, trimethylamine, triethylamine, trimethyllauryl ammonium, monoethanolamine, diethanolamine, triethanolamine, aminoethylaminoethanol, diethylenetriamine, hexaethylenepentamine, dicyandiamide, guanidine or its salt, dicyclohexylamine, and polyethylenepolyamine having the polymerization degree of 5 to 60.

9. The gelled hydrocarbon composition according to claim 1, wherein the gelling agent is a 9 : 1 to 1 : 9 by weight mixture of a nonionic surface active agent having the formula:

$$Z[(OR)_nOH_m]$$

wherein Z is a group capable of being oxyalkylated, OR is alkyleneoxide, $n$ is 1 to 2,000 or more, inclusive, and $m$ is a numeral determined according to the number of functional groups of Z, and a water soluble carboxylic acid or its water soluble salt.

10. The gelled hydrocarbon composition according to claim 9, wherein the group being able to be oxyalkylated defined for Z is a member selected from the group consisting of

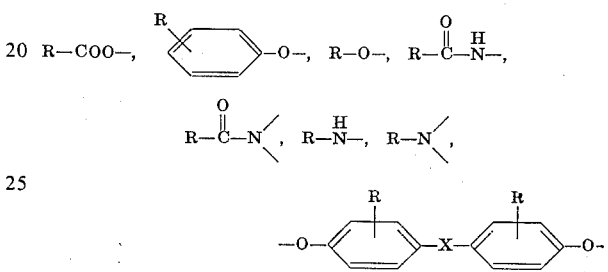

wherein R is an alkyl and X is O, S or SO, —O—(alkyleneoxide block copolymer), polyvalent alcohol derivative, and polycarboxylic acid derivative.

11. The gelled hydrocarbon composition according to claim 9, wherein the carboxylic acid or its salt is a member selected from the group consisting of monocarboxylic acid, dicarboxylic acid, polycarboxylic acid and hydroxycarboxylic acid and its water soluble sodium, potassium, calcium, magnesium, ammonium or organic amine salt.

12. The gelled hydrocarbon composition according to claim 9, wherein the water soluble carboxylic acid or its water soluble inorganic or organic salt is a member selected from the group consisting of oleic acid, lauric acid, octylic acid, propionic acid, oxalic acid, succinic acid, fumaric acid, sebacic acid, adipic acid, EDTA, polyacrylic acid, polymethacrylic acid, tartaric acid, citric acid, gluconic acid and glycolic acid.

13. The gelled hydrocarbon composition according to claim 9, wherein the mixture of a nonionic surface active agent having polyalkyleneoxide chain in the molecule and a carboxylic acid or its salt is a mixture thereof in a proportion of a range of 9 : 1 to 1 : 9.

14. The gelled hydrocarbon composition according to claim 1, wherein the liquid hydrocarbon is contained in an amount of a range of 80 to 99.6 wt. percent.

15. The gelled hydrocarbon composition according to claim 1, wherein water is contained in an amount of a range of 0.05 to 19 wt. percent.

16. The gelled hydrocarbon composition according to claim 1, wherein the gelling agent is contained in an amount of a range of 0.05 to 19 wt. percent.

* * * * *